Oct. 6, 1959 — C. TIETIG — 2,907,580
PNEUMATIC HOLD-DOWN FOR CARGO SPACES
Filed April 26, 1955
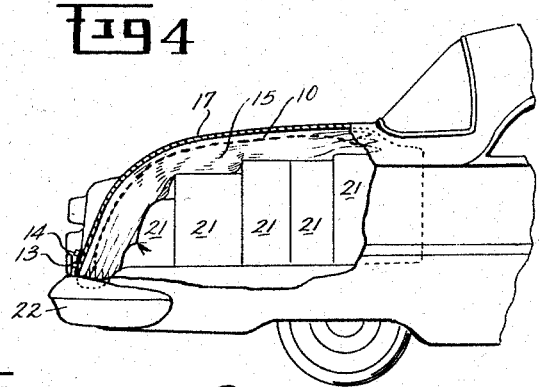
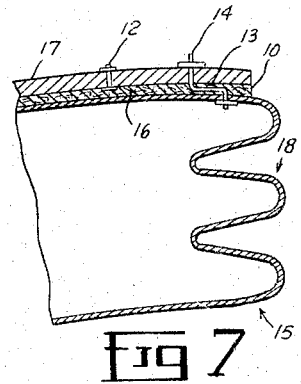
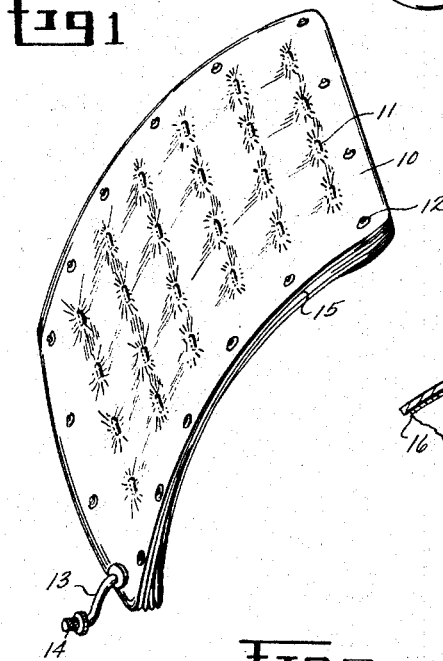
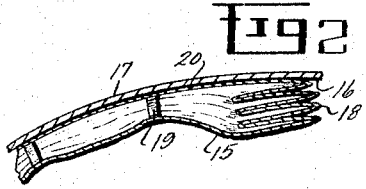
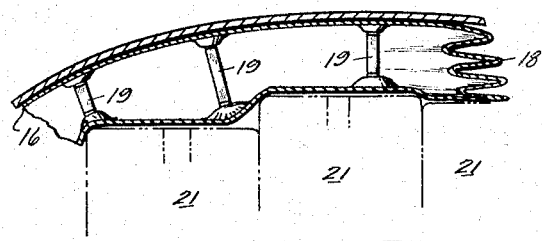
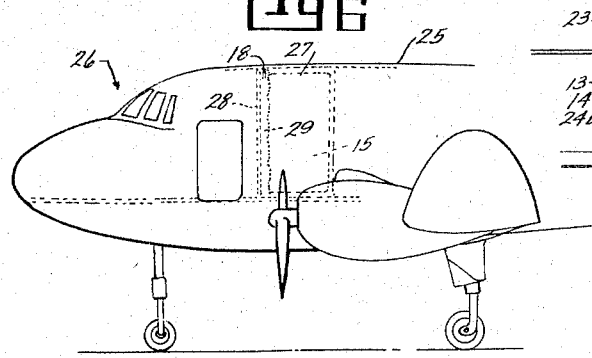
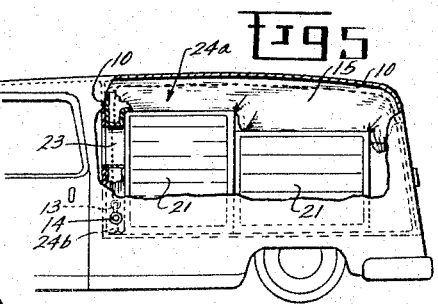
INVENTOR.
Chester Tietig

2,907,580

PNEUMATIC HOLD-DOWN FOR CARGO SPACES

Chester Tietig, Covington, Ky.

Application April 26, 1955, Serial No. 504,010

1 Claim. (Cl. 280—179)

This invention relates to a pneumatic hold-down for the cargo spaces in vehicles and ships.

Among the objects of the invention are the provision of a readily installable bag which may automatically retract to fit snugly against a wall of the cargo space when not in use. Another object is the provision of a readily inflated hold-down which adapts itself to all of the irregular shapes of the cargo and which can hold it firmly without exerting excessive pressure at any point. Another object is to provide for inflation at a point outside the cargo space. In the case of airplanes, an object is to strengthen the fuselage against outside blows and the same advantage may be utilized in ships. That is to say that the invention is valuable in such vehicles whether to hold down cargo or not. It may even be employed in shipping cases.

Briefly stated, the invention comprises a bag of strong, airtight and preferably thin textile material. The bag is attached to a heavier wall which may be attached to an interior bulkhead of an automobile trunk, truck body, airplane cargo space or ship's hold. The sides of the bag are preferably made to fold like an accordion when uninflated and elastic straps connect the interior surfaces of the heavier wall and the opposite wall of the bag. These enable the bag to be retracted to a flat pack when the air is voided.

Referring now to the accompanying drawings:

Fig. 1 is an elevational view of the hold-down detached from any vehicular structure.

Fig. 2 is a cross sectional detail of the hold-down (deflated) attached to a curved structural surface of a vehicle.

Fig. 3 is a view corresponding to Fig. 2 showing a more extensive view, the hold-down being now inflated and at work in holding down cargo.

Fig. 4 is an elevational view of the rear end of a passenger automobile, the side wall of the trunk being partially broken away to show the hold-down inflated and attached to the inner surface of the trunk lid, and at work holding down cargo.

Fig. 5 is a view similar to Fig. 4 except that the vehicle shown is a truck with a van body, partly broken away.

Fig. 6 is a side elevation of a transport airplane showing in dotted line a bulkhead behind the pilot's compartment to which is attached a hold-down which is expansible aft in the direction of the tail assembly (not shown).

Fig. 7 is a cross section of the hold down as attached to an automobile trunk lid by mechanical fasteners extending through a semi-stiff backing to which the inflatable bag is attached, and through one corner of the trunk lid. This form is the preferred form of the invention.

Referring again to Fig. 1, 10 is a semi-stiff backing made preferably of glass cloth of 1/16" to 1/8" thickness. These dimensions are given for the sake of illustration only. Other dimensions and other materials may also be employed provided they are semi stiff, reasonably waterproof and durable. Under certain circumstances, hereinafter disclosed the backing may be modified or dispensed with. On the rear of the backing 10 there may be visible a multiplicity of dimples 11 produced by the internal structure of the device. About the margin of backing 10, there are a considerable number of fasteners 12 of any well known type which are adapted to co-operate with slotted grommets on a flange (not shown) attached to the margin of the wall or partition to which the backing 10 is to be attached. Such attachment is easily undone by hand and where permanent fastening is not objectionable, adhesive fastening with a permanent adhesive such as water glass or synthetic resin glue is preferred. A tire type of check valve 13 having a cap 14 is provided preferably at one corner of the backing 10 to project through one corner of a wall of the box-like structure in which cargo is to be firmly positioned. The object of such construction is to enable a bag 15 which is attached to the backing 10 to be inflated from the outside of the box-like structure to exert a pressing action on objects placed within the structure, regardless of the shape of the objects.

Referring to Fig. 2, 16 is the curved surface of the lid of an automobile trunk compartment (shown in greater detail in Figs. 3 and 4). To the inner surface 16 there is attached the bag 15 either directly, as shown, or through the intermediary of the semi stiff backing 10 shown in Fig. 1. It is to be understood that an article such as an automobile trunk compartment lid 17 or equivalent structure such as a wall of a shipping case when permanently combined with an extending inflatable bag 15 with an inflating valve through the lid or wall is an article of manufacture within the purview of the invention.

The bag in any case should be fairly thin so that it may flex sharply without cracking. It should be mechanically very strong, substantially air tight and abrasion resistant. Such a bag may be made of woven nylon fabric which has been impregnated and/or coated with "neoprene" which is a synthetic oil proof rubber derived from acetylene. Thin glass cloth of high quality similarly coated or impregnated may alternatively be employed.

As shown in Fig. 2, the edges of the bag 15 are so constructed or molded that they assume an accordion pleated form comprising a plurality of pleats 18 when the bag 15 is not inflated or only very slightly inflated. This feature of the invention is of great convenience in automobile trunk compartments since the bag 15 is automatically pulled out of the way as soon as deflated; however it is a refinement and is not strictly necessary. Internal resilient straps or cords 19 may be employed alternatively to the accordion pleated edges or in addition thereto to hold the bag 15 against the compartment wall when the bag is deflated thereby achieving minimum volume. It is to be noted that in Fig. 2 the place of the backing 10 has been taken by a permanent adhesive which is not shown because too thin, but is indicated by 20.

In Fig. 3, as distinguished from Fig. 2, the bag 15 is shown inflated and in operation to hold down various boxes of cargo 21. Fig. 3 forms a detail in section of the trunk compartment shown with one side broken away in Fig. 4. In Fig. 3 the pleats 18 are somewhat distended and the resilient straps are stretched to different degrees. The bag 15 accommodates its shape to the shape of the boxes 21 and exerts an approximately even degree of pressure on each, thereby preventing tumbling and to a substantial degree, breakage and shifting.

In Fig. 4 the backing 10 is again shown flexed to conform to the compartment lid. The valve 13—14 is extended through the lid 17 near the car bumper 22 and at a corner of the lid so that it is readily accessible for inflation and deflation. The latter is accomplished just as it is in the case of a tube in a tire.

The method of using the device is obvious. The cargo is put in the compartment, the bag 10 is deflated at the time. After the cargo is arranged as desired, the compartment is tightly closed and the bag inflated through the valve 13—14. The degree of inflation is dependent first and foremost on the puncture resisting strength of the bag and secondly on the degree of immobility necessary for the cargo. Obviously while 5 lbs. per square inch will serve for ordinary cargo, to hold boxes of explosives down securely and safely might take 10 lbs. per square inch. Likewise, if a stiffening of the fuselage of an airplane were one of the effects desired as well as the holding down of the cargo, the pressure employed would be higher to obtain both effects rather than solely a holding down effect. In any event, the stiffening of structure resulting from the use of my device is appreciable and by no means without value.

Referring now to Fig. 5, the truck having a van body contains cargo boxes 21 about interior of which is disposed, except on the floor, a backing 10 to which is attached a bag 15. An air check valve 13—14 projects through one side of the van body adjacent a corner thereof near the floor. At 23 a space is indicated which is a discontinuity resulting from the employment of two of my complete devices 24a and 24b. The sectionalized part of 24a at the left side of Fig. 5 shows that the backing 10 may be preformed to include an angle, in this case a right angle, so that a single bag 15 can press against the cargo 21 from several directions. It shows further that a device 24b can be employed in a smaller size than necessary to cover an entire wall of a vehicle.

Referring now to Fig. 6, 25 is the fuselage of a transport or other airplane compartment 27. This compartment may be one of several (not shown) or may comprise the entire interior of the fuselage 25. Attached to the rear of a vertical wall or bulkhead there is one of my devices 29, in this case provided with many folds or pleats 18 so that it may extend when inflated to a comparatively long distance rearwardly to the rear surface of bag 15 shown inflated in dotted line. In such case it is obvious that the walls of the fuselage 25 are interiorly strengthened in proportion to the degree of inflation of the bag 15. With the addition of more devices 29 to fill up the entire fuselage, the entire airplane 26 is strengthened. Cargo (not shown) can be held between the devices 29 in any position which may be convenient.

As shown in Fig. 7, 17 is the curved lid of an automobile trunk the edges of which lid are provided internally with halves of mechanical fasteners, for example, snap buttons. To the inner surface 16 of the lid there is fitted a semi-stiff backing 10 of fiberglass cloth or equivalent. This may be a fiberglass mat having a matrix of rubber around the glass fibers. The semi stiff backing also bears halves of snap buttons at places around its edges where the button halves will mate with those on the lid surface 16. Adhesively attached to the inner surface of the backing 10, the bag 15 is unpierced except for the inlet valve pipe 13 which extends through it and the lid 17. The pipe 13 is provided with the conventional tire valve and lock nut 14 on the outside surface of the lid 17. The bag 15 is molded with pleats 18 at its edges so that it will be strongly retracted when deflated so that there will be little bulk in the trunk and so that such bulk as there is will be flattened against the backing 10 to provide a smooth surface. When extended by inflation, it may assume any shape that the cargo within the trunk constrains it to do, as shown in Fig. 4. The advantage of the backing as a member of the combination is that of speed, neatness and convenience. It distributes the bag 15 over the lid surface 16 so that the snaps are easily fastened by one person without trouble created by the flopping of a loose bag. It may be propped up by the backing against the trunk lid by a single prop and then conveniently fastened by one person. When it is desired to take the bag and backing assembly off, the operation is no less expeditious. The backing will hold the bag and keep it from falling by means of a single prop until the last snap button is unfastened. The bag and backing can then be lifted out together and placed on a shelf or leaned against a wall while avoiding creases in the rubber except those that are molded in. These will not cause deterioration of the rubber in storage as would be the case if the loose bag were laid upon a shelf. Finally, the backing 10 will prevent many punctures of the bag 15 that might otherwise occur from sharp corners of the cargo pressing the bag against the surface, much indentation thereof can occur without the bag being punctured. The lid 17 is also protected against unsightly bulges which might be caused by the cargo corners indenting the lid from the inside of the trunk. If the backing 10 were not used at all, the bag could not be removed except by dissolving or mechanically removing the adhesive layer 20, which might and probably would cause injury to the bag. The construction shown in Figs. 4 and 7 permits the use of an adhesive to hold the bag without the disadvantages of handling which are inherent in a loose, floppy large sized bag structure.

I claim as my invention:

In a pneumatic hold-down for cargo in cargo spaces, a semi-stiff curve-conformable backing, fasteners on said backing for the attachment thereof to a wall of a cargo space, an inflatable, substantially air-tight structure made of strong, thin, flexible non-porous material attached to said backing substantially to cover the entire area thereof and to leave all but the attached area free to move outward from said backing upon inflation, elastic means connecting substantially equi-distant points within the inflatable structure between the backing and at least one of the outwardly movable walls, whereby on release of the inflating gas from said inflatable structure, said movable walls will be retracted to as close contact with said backing as said elastic means will allow, sides on said inflatable structure adapted to accomplish accordion folding of the sides upon deflation of the structure and a check valve of the tire-inflation type extending through said backing and cargo wall to which it is attached, into said inflatable structure for inflation thereof.

References Cited in the file of this patent

UNITED STATES PATENTS

| 598,054 | Meany | Jan. 25, 1898 |
| 1,457,496 | Butler | June 5, 1923 |
| 1,675,957 | Reeves | July 3, 1928 |
| 1,717,533 | Ward | June 18, 1929 |
| 2,558,807 | Bailey | July 3, 1951 |
| 2,636,457 | Finlay | Apr. 28, 1953 |
| 2,657,884 | Merrill | Nov. 3, 1953 |
| 2,774,503 | Moore | Dec. 18, 1956 |

FOREIGN PATENTS

| 498,063 | France | Oct. 4, 1919 |
| 26,505 | Great Britain | 1905 |
| 708,759 | Great Britain | May 12, 1954 |